United States Patent [19]

Jean

[11] Patent Number: 5,778,660
[45] Date of Patent: Jul. 14, 1998

[54] THRUST REVERSER FOR A TURBOFAN JET ENGINE

[75] Inventor: Michel Christian Marie Jean, Harfleur, France

[73] Assignee: Societe Hispano Suiza, Colombes, Cedex, France

[21] Appl. No.: 729,943

[22] Filed: Oct. 15, 1996

Related U.S. Application Data

[63] Continuation of Ser. No. 495,072, Jun. 27, 1995, abandoned.

[30] Foreign Application Priority Data

Jun. 30, 1994 [FR] France .................. 94 08056

[51] Int. Cl.$^6$ .................................. B64D 33/04
[52] U.S. Cl. ............. 60/226.2; 60/232; 239/265.29; 244/110 B
[58] Field of Search ............. 60/226.2, 226.3, 60/228, 232; 244/110 B; 239/265.29, 265.31

[56] References Cited

U.S. PATENT DOCUMENTS

| | | |
|---|---|---|
| 3,280,561 | 10/1966 | Kutney . |
| 3,353,355 | 11/1967 | Jordan ............................. 244/110 B |
| 3,844,482 | 10/1974 | Stearns ............................. 60/226.2 |
| 3,856,239 | 12/1974 | Leibach ............................. 60/226.2 |
| 3,877,663 | 4/1975 | Curran et al. ............................. 244/110 B |
| 3,917,198 | 11/1975 | Sanders ............................. 60/226.2 |
| 4,216,923 | 8/1980 | Harris . |
| 4,216,926 | 8/1980 | Lawson ............................. 244/110 B |
| 5,390,879 | 2/1995 | Lair ............................. 244/110 B |

FOREIGN PATENT DOCUMENTS

| | | |
|---|---|---|
| 2 625 261 | 6/1989 | France . |
| 2 650 861 | 2/1991 | France . |

*Primary Examiner*—Timothy Thorpe
*Assistant Examiner*—Ted Kim
*Attorney, Agent, or Firm*—Bacon & Thomas

[57] ABSTRACT

A thrust reverser for a turbofan-type turbojet engine in which the axial length of the fan housing is less than that of the turbojet engine cowling such that the movable thrust reverser baffles may be attached to the jet engine cowling and moved to an extended position wherein the cold flow gases emanating from the cold flow exhaust duct are redirected to provide a thrust reversing force. The baffles are movably attached to the engine cowling by a plurality of linkrods forming a deformable parallelogram kinematic linkage. Each of the linkrods has opposite ends pivotally attached to the movable baffle and to the engine cowling, respectively. An actuator is connected between the movable baffle and the engine cowling to move the baffle between an extended position, wherein it redirects the cold flow gases to provide a thrust reversing force, and a retracted position wherein the outer surface of the movable baffle is substantially flush with the outer surface of the engine cowling so as to minimize disturbances of the cold flow gases passing over the surface of the cowling. The actuator may be either located forwardly of the baffle or rearwardly of the baffle.

6 Claims, 5 Drawing Sheets

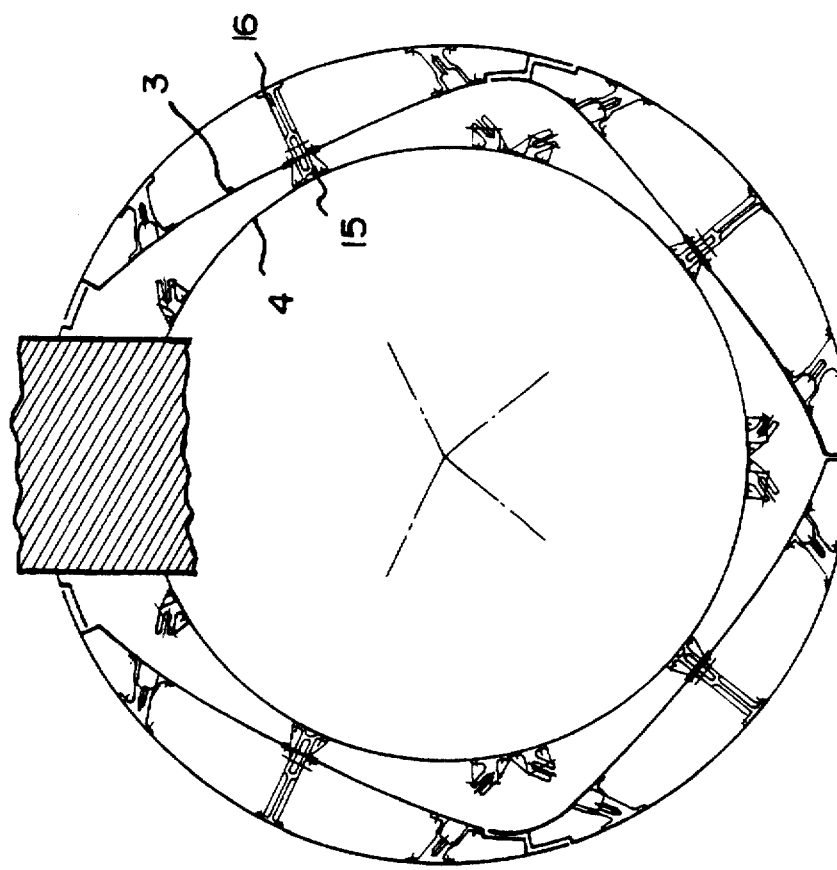
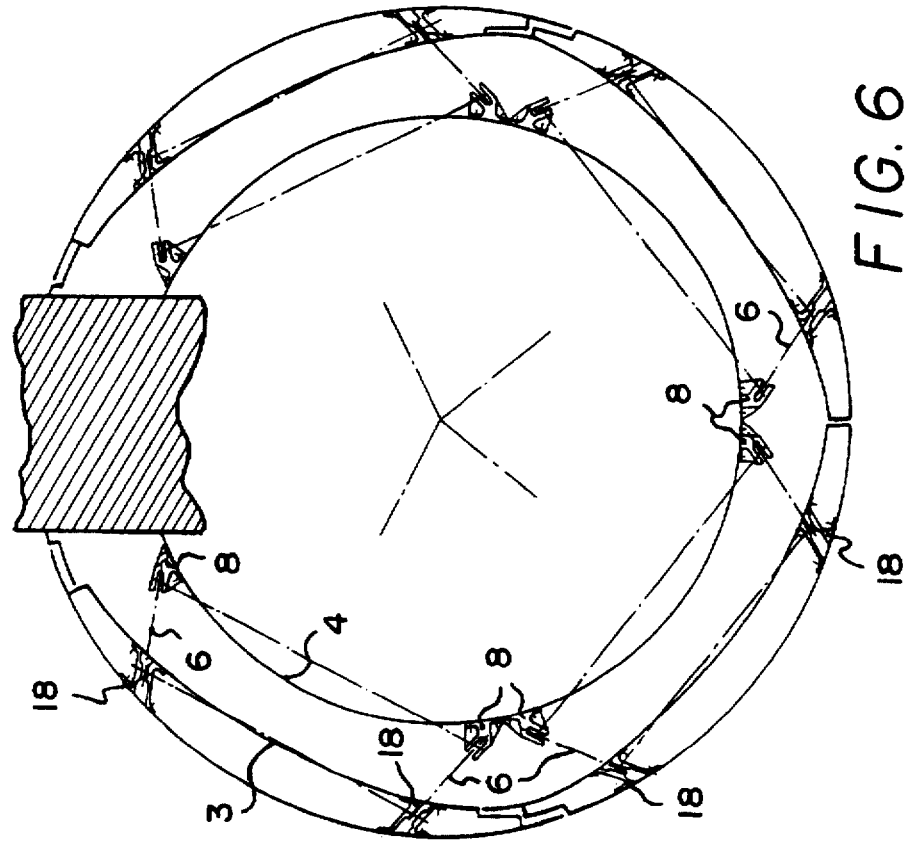
FIG. 7
FIG. 6

THRUST REVERSER FOR A TURBOFAN JET ENGINE

This application is a Continuation of application Ser. No. 08/495,072, filed Jun. 27, 1995, now abandoned.

BACKGROUND OF THE INVENTION

The present invention relates to a thrust reverser for a turbofan-type turbojet engine, more particularly such a thrust reverser wherein the movable baffles are mounted on the engine cowling downstream of the fan housing.

Known turbofan-type turbojet engines typically have a primary circulation duct for the circulation of hot gases emanating from the turbojet engine and a secondary annular duct, usually coaxially arranged about the primary duct, for circulation of the cold flow gases generated by the rotation of the turbofan. In such engines, particularly those having a high bypass ratio, it is known to provide a thrust reverser which acts primarily or solely on the cold flow gases in the secondary, cold flow duct.

In such configurations, it is known to make use of displaceable thrust reverser baffles which, in their extended positions, form an annular assembly sealing the secondary, cold flow duct in order to reverse the secondary gas flow to provide reverse thrust forces. When operating in the forward thrust mode, the baffles are retracted to allow the secondary gas flow to circulate through the secondary, cold flow duct. The movable baffles typically are retracted into the radially outer wall which bounds the secondary, cold flow duct.

Other thrust reverser designs are known, which are particularly applicable to turbofan engines having high bypass ratios when the fan housing is axially shorter than the wall defining the primary, hot flow duct in which the movable baffles retract into the wall defining the primary, hot flow duct. U.S. Pat. No. 3,280,561 and French Patent 2,625,261 disclose such designs in which the displaceable baffles are pivotally attached to the engine cowling so as to pivot about a fixed pivot axis when acted on by an actuator. In such designs, displacement of the thrust reverser baffle entails a position obstructing the secondary, cold flow duct and hampering engine operation. Such designs also exhibit safety problems, since the movable baffles are not self-closing in the event of an actuator or locking mechanism malfunction, particularly where the fixed pivot axis is located towards the rear end of the movable baffle.

In such designs wherein the fixed pivot axis is located near an upstream, or front portion of the movable baffle, it is the exterior surface of the baffle which contacts the secondary, cold flow gases to provide the thrust reversing forces.

However, the design of the engine cowling and, hence, the outer surface of the movable baffle is configured such that it cannot provide for optimum redirection of the cold flow gases and, therefore, the reverse thrust forces are not optimized. This design also requires a retractable or movable deflector at the end of the movable baffle which must be of a substantial size to increase the efficiency of the thrust reverser. Due to its nature and location, the movable deflector is subjected to high stresses and consequent unreliability.

SUMMARY OF THE INVENTION

The present invention relates to a thrust reverser for a turbofan-type turbojet engine in which the axial length of the fan housing is less than that of the turbojet engine cowling such that the movable thrust reverser baffles may be attached to the jet engine cowling and moved to an extended position wherein the cold flow gases emanating from the cold flow exhaust duct are redirected to provide a thrust reversing force. The baffles are movably attached to the engine cowling by a plurality of linkrods forming a deformable parallelogram kinematic linkage. Each of the linkrods has opposite ends pivotally attached to the movable baffle and to the engine cowling, respectively. An actuator is connected between the movable baffle and the engine cowling to move the baffle between an extended position, wherein it redirects the cold flow gases to provide a thrust reversing force, and a retracted position wherein the outer surface of the movable baffle is substantially flush with the outer surface of the engine cowling so as to minimize disturbances of the cold flow gases passing over the surface of the cowling. The actuator may be either located forwardly of the baffle or rearwardly of the baffle.

The linkrod mechanism has a pair of first, forward linkrods pivotally attached between the engine cowling and the baffle each having a length $L_1$ and a second, rearward pair of linkrods pivotally attached to the engine cowling and to the movable baffle aft of the attachment of the forward linkrods, each of the rearward linkrods having a length $L_2$ such that $L_1$ is greater than L. The actuator may comprise a power cylinder having an extendable and retractable piston rod wherein the cylinder is pivotally attached to the engine cowling and the end of the piston rod is attached to the movable baffle.

In the thrust reverser according to this invention, each of the movable baffles is kept in a retracted, forward thrust mode until acted on by the actuator and then will be pivoted to its extended position by the linkrods which form a deforming four bar linkage kinematic system.

BRIEF DESCRIPTION OF THE DRAWINGS

FIG. 6 is a cross-sectional view taken along line VI—VI in FIG. 4.

FIG. 7 is a cross-sectional view taken along line VII—VII in FIG. 4.

DETAILED DESCRIPTION OF THE PREFERRED EMBODIMENT

FIGS. 1–7 illustrate a turbofan-type turbojet engine with separate hot and cold gas flows wherein the outer wall 1 defines an outer boundary of the secondary, or cold-flow gas duct 22 which has a downstream, or aft, end 2 defined by the trailing edge of the fan housing. As can be seen, the fan housing is relatively short axially and is typical of such aircraft engines which are suspended by mounting struts from an aircraft structure. This configuration has proven to be unsuitable for mounting the movable baffles of a thrust reverser in the outer wall 1 bounding the cold flow duct 22.

Figure 1:
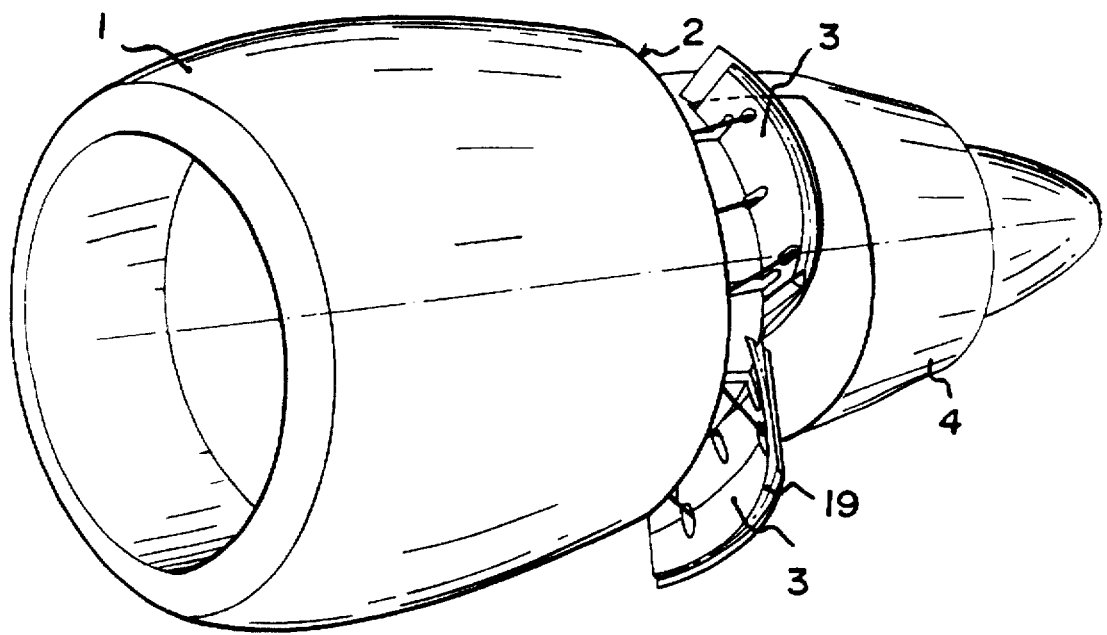
FIG. 1 is a perspective view of a turbofan-type turbojet engine including the thrust reverser according to the present invention with the movable baffles in their extended, reverse thrust positions.
Figure 3:
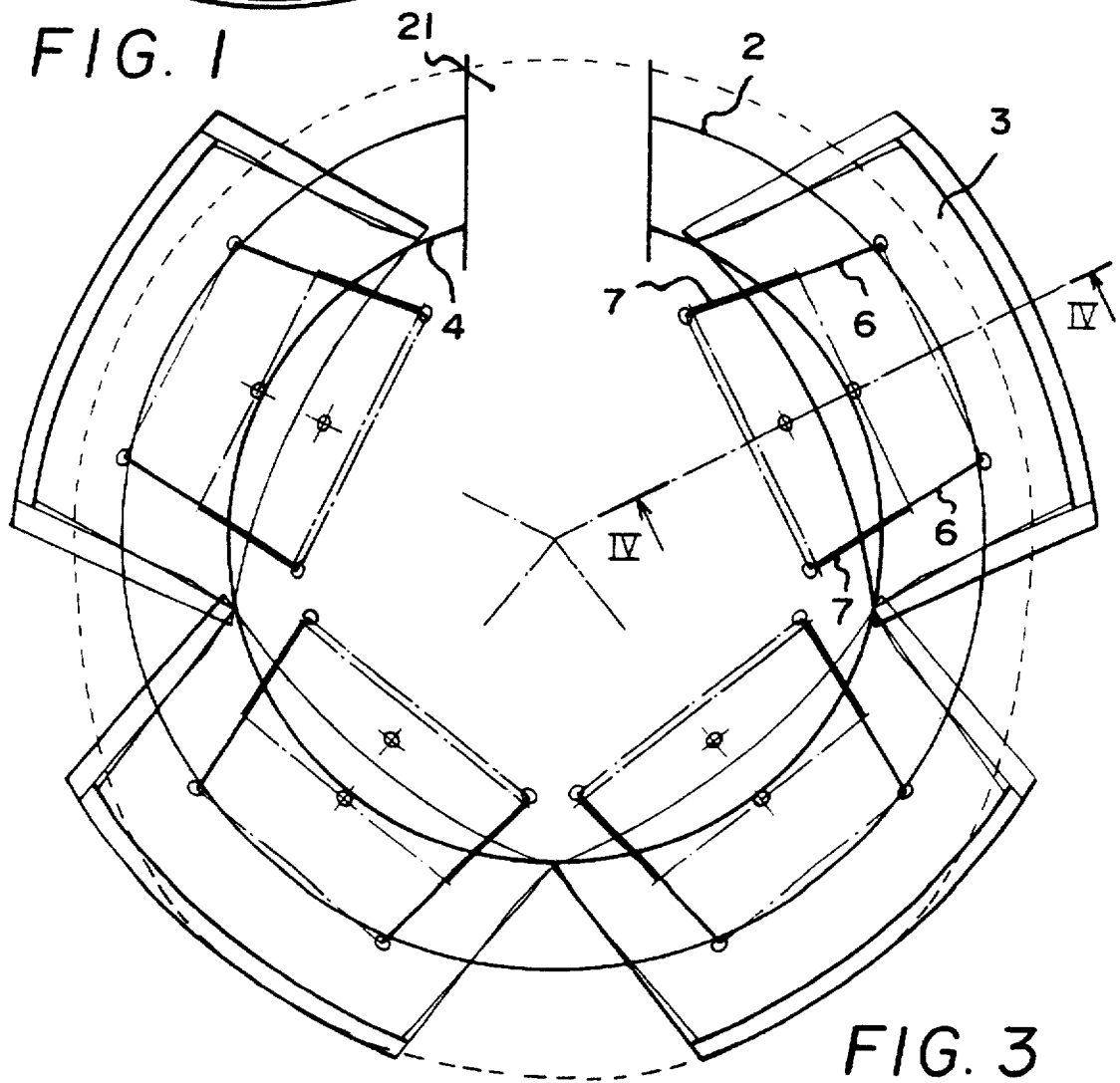
FIG. 3 is a front view of the turbojet engine shown in FIG. 1.

The thrust reverser according to the present invention mounts the movable baffles 3 of the thrust reverser aft or downstream of the downstream end 2 of the fan housing on the engine cowling 4 of the turbojet engine. FIG. 1 illustrates the movable baffles in their extended positions wherein they deflect in a forward direction the secondary or cold flow gases so as to generate a reverse thrust. Although the invention will be described and illustrated using four such movable baffles 3, it is to be understood that more or less than this number may be utilized without exceeding the scope of the present invention.

Figure 4:
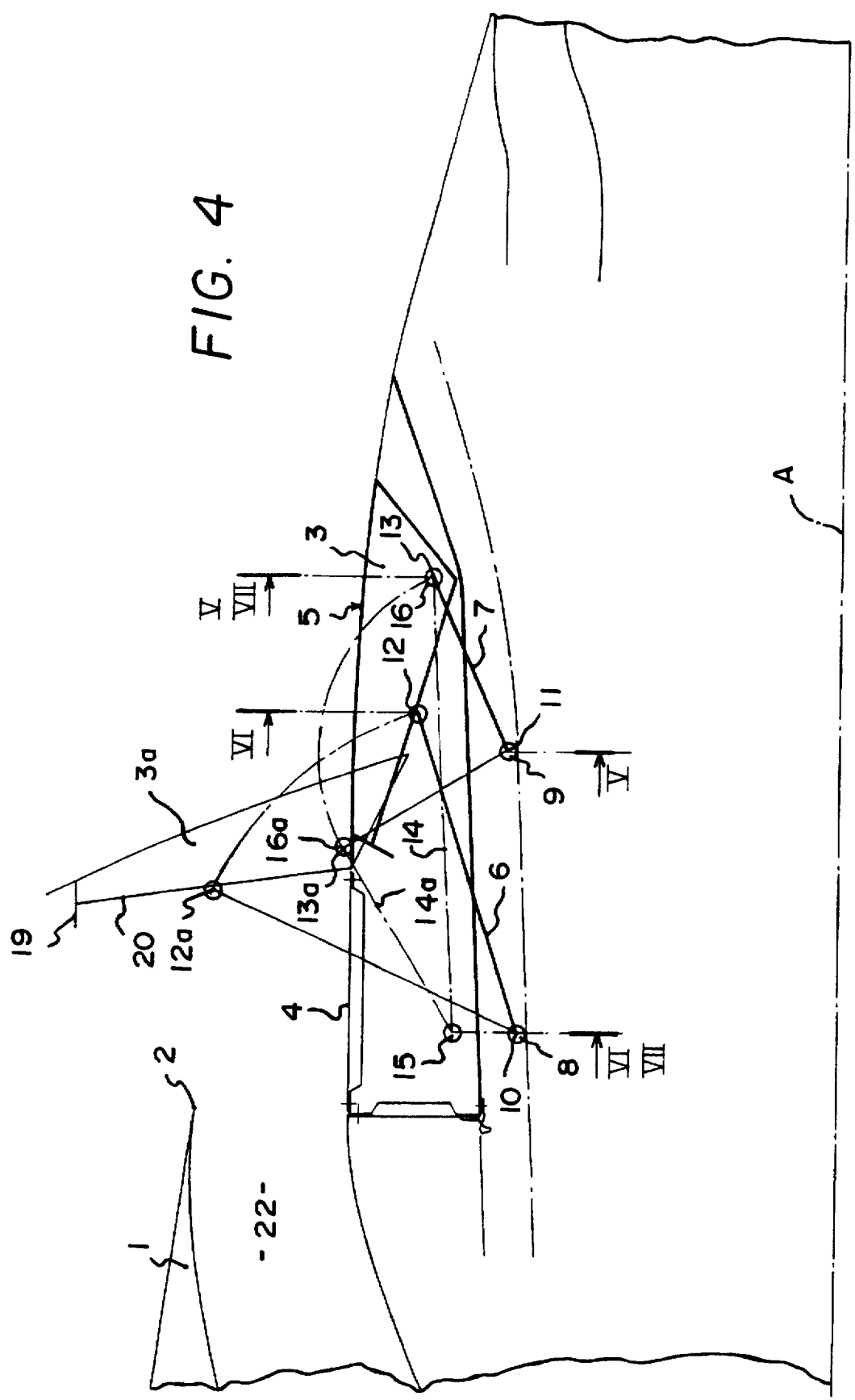
FIG. 4 is a partial, schematic, side view illustrating the movement of the thrust reverser baffle between the extended and retracted positions of the embodiment illustrated in FIG. 1.

Each baffle 3 comprises an outer panel 5 having an outer surface configured such that, when the baffle 3 is in its retracted position, as illustrated in solid lines in FIG. 4, the outer surface of the panel 5 is substantially flush with the outer surface of the jet engine cowling 4 thereby precluding any aerodynamic disturbance of the secondary or cold flow gases emanating from secondary duct 22. In the embodiment shown, each movable reverser baffle 3 is held in place in its retracted, or forward thrust position, and is guided to its extended, reversed thrust position during thrust reversal by two forward linkrods 6 and two rear linkrods 7. The stationary structure of the jet engine cowling 4 has fixed pivots 8 and 9 in which are pivotally mounted the ends 10 and 11 of the linkrods 6 and 7, respectively. The opposite ends 12 and 13 of the linkrods 6 and 7 are each pivotally attached to the movable baffle 3.

An actuator 14 is pivotally attached to support 15 on the jet engine cowling 4. The actuator 14 has an extendable and retractable piston rod with an end 16 pivotally attached to the movable baffle 3. FIG. 4 illustrates the retracted and extended positions of the movable baffle 3 as well as the linkrods and the actuator. The retracted, forward thrust positions of the elements are illustrated by heavy lines, while the extended, reverse thrust positions are illustrated at 3a, 12a, 13a, 14a and 16a, respectively. In the embodiment illustrated in FIG. 4, the stationary pivot mounting 15 of the baffle control actuator 14 is located forwardly or upstream of the baffle 3. As can be seen, in the forward thrust position, the actuator 14 is also located below the baffle 3 towards the central axis A.

This configuration also ensures that the actuator 14 will not disturb the gas flow during the reverse thrust mode. When the baffle 3 is in its extended position, as illustrated at 3a, the actuator is positioned at 14a and is located completely out of the gas flow, thereby preventing any disturbance of the gas flow by the actuator.

Figure 9:
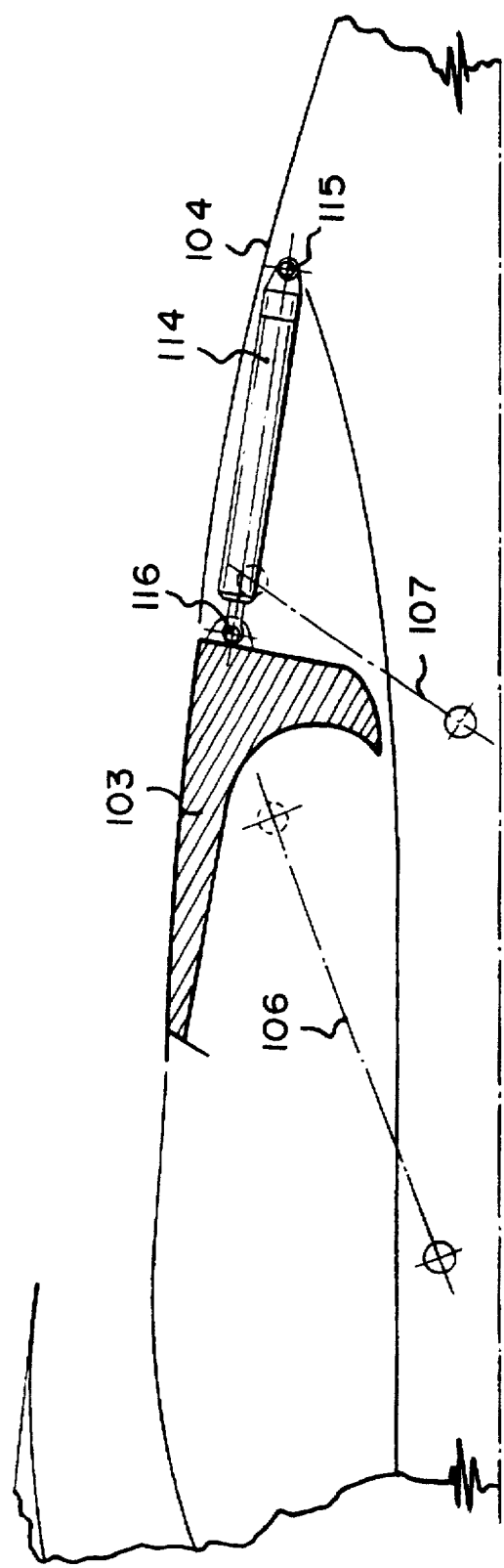
FIG. 9 is a partial, schematic, cross-sectional side view illustrating the embodiment of FIG. 8 with the baffle in the retracted position.
Figure 8:
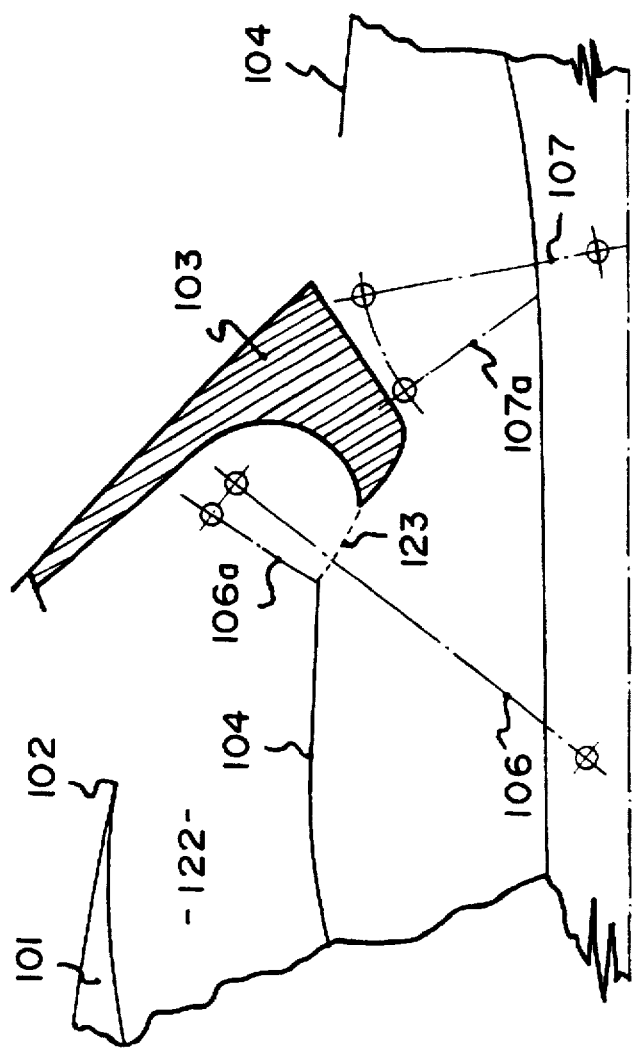
FIG. 8 is a partial, schematic, side cross-sectional view illustrating an alternative embodiment of the thrust reverser according to the present invention with the baffle in its extended position.

As illustrated in FIGS. 8 and 9, the actuator may alternatively be located to the rear of the movable baffle. In these figures, baffle 103 is again supported by linkrods 106 and 107 similar to the previously described embodiment and the control actuator 114 is located downstream or to the rear of the baffle 103. Actuator 114 is pivotally attached to the jet engine cowling 104, at 115 and has an extendable and retractable piston rod that is pivotally attached to the baffle 103 at 116.

Figure 5:
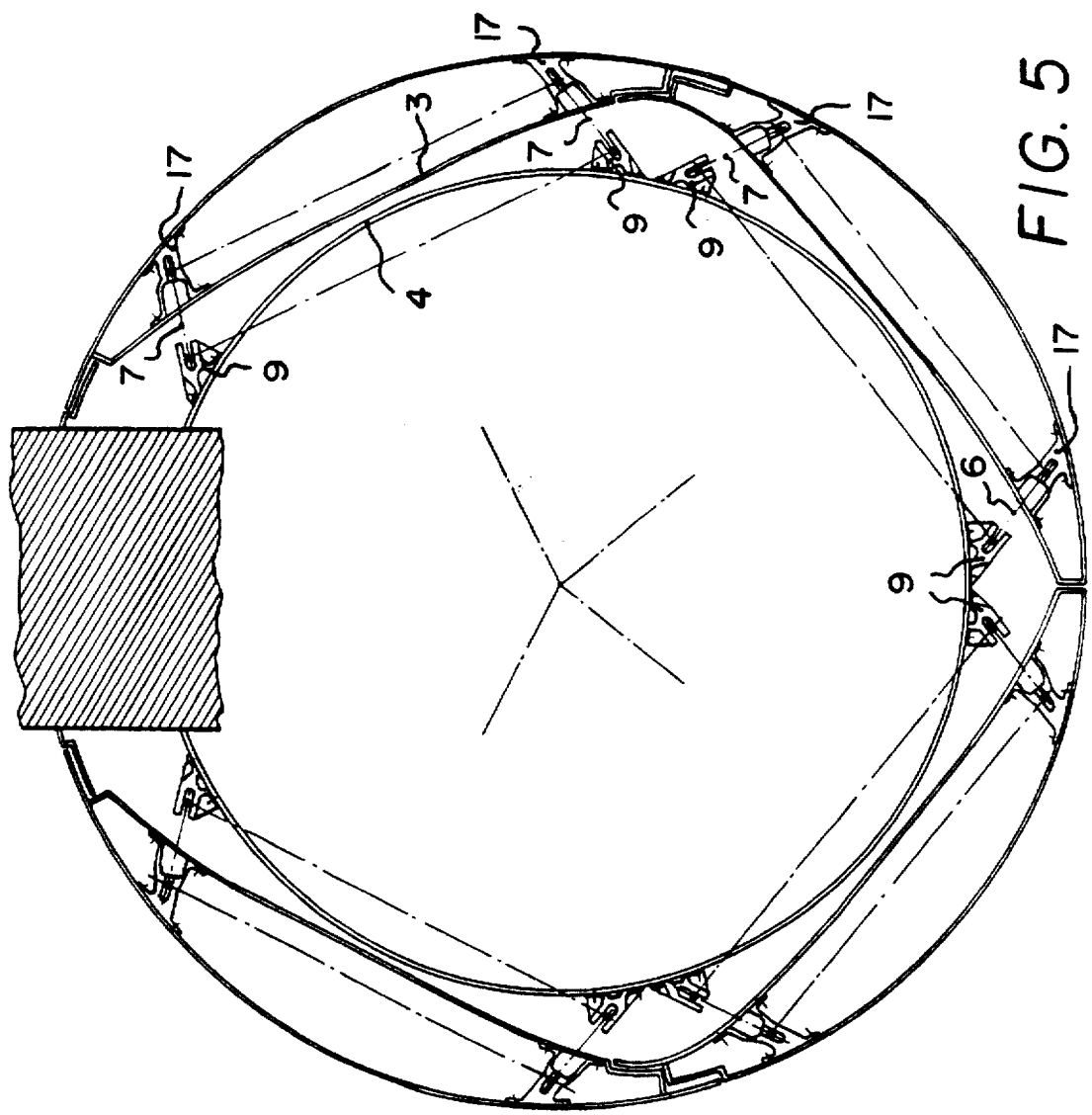
FIG. 5 is a cross-sectional view taken along line V—V in FIG. 4.
Figure 2:
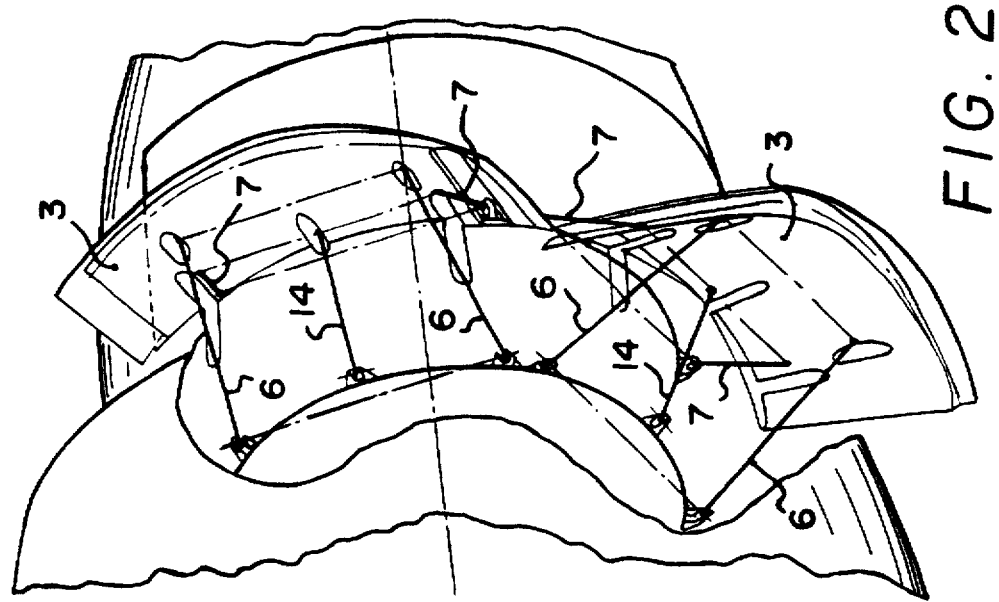
FIG. 2 is a partial, perspective view of the structure shown in FIG. 1.

In the embodiment illustrated in FIGS. 1–4, the design details of the stationary hinge supports 9 for the rear linkrods 7 are illustrated in FIG. 5 as are the hinges 17 to which the linkrods 7 are pivotally attached to the baffle 3. Similarly, FIG. 6 illustrates the stationary hinge supports 8 on the jet engine cowling 4 for attachment of the ends 10 of the linkrods 6. Hinges 18 on the movable baffle 3 are also illustrated to which are attached the opposite ends 12 of the linkrods 6. FIG. 7 is a similar view illustrating the hinge supports 15 and 16 for attachment of the actuator 14 to the jet engine cowling 4 and the movable baffle 3, respectively.

The jet engine cowling 4 may comprise, in known manner, a pair of semi-cylindrical structures pivoted at their attachment point to the aircraft mounting pylon 21, schematically illustrated in FIGS. 3 and 5–7, wherein the semi-cylindrical structures open in opposite directions, their closure being implemented by known locking means, omitted from the drawings for the sake of clarity. Also in known fashion, each baffle 3 has a deflector 19 at its distal end when in the extended position and may further comprise an inner wall 20 whose contour may be configured to achieve optimum desired performance during thrust reversal, since the inner wall 20 will contact the gases emanating from the cold flow duct 22.

As can be seen from the drawings, the forward linkrods 6 have a length $L_1$ and the rear linkrods 7 have a length $L_2$ such that $L_1$ is greater than $L_2$. Thus, as the baffle 3 is moved, due to forces imparted thereon by the actuator 14, the lengths of the linkrods will cause the baffle 3 to pivot to the position 3a illustrated in FIG. 4. The jet cowling 4, the baffle 3, and linkrods 6 and 7 create a deforming parallelogram kinematic linkage.

During movement of the baffle member from its retracted, forward thrust position to its extended, reverse thrust position, the baffle 3 initially rises from the jet engine cowling 4 thereby subtending a passage beneath the baffle 3 and the jet cowling 4. Excessive obstruction of the secondary or cold gas flow which would create turbojet engine pumping, is thereby precluded.

In the embodiment illustrated in FIGS. 8 and 9, as best seen in FIG. 8, the baffle 103 defines a space 123 upstream of the baffle between it and the jet cowling 104 before the baffle 103 reaches its fully extended reverse thrust position allowing flow therethrough. While the forward linkrods 106 reach their terminal displacement positions 106a, the rear linkrods 107 proceed with the displacement of the baffle 103 to close the space 123 between the jet cowling 104 and the inner surface of the baffle 103. When the baffle 103 has assumed its extended, reverse thrust position, sufficient space is left between its inside surface and the trailing edge 102 of the fan housing 101 to deflect gas flow from the secondary or cold flow duct 122.

The thrust reverser according to the present invention allows the optimization of the thrust reversing surfaces and the outer aerodynamic surfaces, while at the same time provide a relatively simple control system. The positions selected for the linkrods are such that the baffles are self closing and are biased toward self-closure in case of a malfunction of the actuator or the mechanism which locks the baffles in their retracted positions. Steering or directing the flow of gases during thrust reversal may also be optimized by matching the kinematics of each baffle, which may be different from the kinematics of other baffles of the same engine structure to achieve the desired results. Such kinematics may be ascertained by using different lengths of linkrods for each particular baffle application.

The foregoing description is provided for illustrative purposes only and should not be construed as in any way limiting this invention, the scope of which is defined solely by the appended claims.

I claim:

1. A thrust reverser for a fan-type turbojet engine having a longitudinal axis, a fan housing defining an outer boundary of a cold flow exhaust duct and having a fixed rear end portion forming an aft end of the fan housing, a turbojet engine cowling forming an inner boundary of the cold flow exhaust duct and having an end portion extending axially away from the aft end of the fan housing and comprising:

a) at least one movable thrust reversing baffle having a forward edge and a rear edge;

b) a plurality of linkrods each pivotally connected to the at least one thrust reversing baffle and the end portion of the turbojet engine cowling forming a four bar linkage movably attaching the at least one thrust reversing baffle to the end portion of the turbojet engine cowling extending axially away from the aft end of the fan housing such that the at least one thrust reversing baffle is located to the rear of the aft end of the fan housing and is movable between a retracted, forward thrust position and an extended reverse thrust position wherein the forward edge extends outwardly away from the turbojet engine cowling further than the rear edge so as to redirect gases emanating from the cold flow exhaust duct so as to produce a reverse thrust wherein the plurality of linkrods comprises:

i) a first pair of linkrods each having a first end pivotally attached directly to the turbojet engine cowling and a second end pivotally attached to the at least one thrust reversing baffle; and, ii) a second pair of linkrods each having a first end pivotally attached directly to the turbojet engine cowling and a second end pivotally attached to the at least one thrust reversing baffle; and, c) an actuator connected to the turbojet engine cowling and the at least one thrust reversing baffle so as to move the at least one thrust reversing baffle between its extended and retracted positions.

2. The thrust reverser of claim 1 wherein the first pair of linkrods each have a length $L_1$ and the second pair linkrods each have a length $L_2$ such that $L_2$ such that $L_1 > L_2$.

3. The thrust reverser of claim 1 wherein the turbojet engine cowling has an outer surface and further comprising an outer surface on the at least one thrust reversing baffle configured so as to be substantially flush with the outer surface of the turbojet engine cowling when the at least one thrust reversing baffle is in the retracted position.

4. The thrust reverser of claim 4 wherein the at least one thrust reversing baffle has an inner surface whereby the inner surface and the turbojet engine cowling define a space therebetween as the at least one thrust reversing baffle moves between the extended and retracted positions.

5. The thrust reverser of claim 1 wherein the actuator is located forwardly of an attachment of the actuator to the at least one thrust reversing baffle.

6. The thrust reverser of claim 1 wherein the actuator is located rearwardly of an attachment of the actuator to the at least one thrust reversing baffle.

* * * * *

UNITED STATES PATENT AND TRADEMARK OFFICE
CERTIFICATE OF CORRECTION

PATENT NO. : 5,778,660
DATED : July 14, 1998
INVENTOR(S) : JEAN

It is certified that error appears in the above-indentified patent and that said Letters Patent is hereby corrected as shown below:

Column 2:

Line 24, "L." should read --$L_2$.--

Column 4:

Line 29, "parallelogram" should read --four bar--.

Column 6:

Line 12, delete "such that $L_2$".

Line 19, "4" should read --3--.

Signed and Sealed this

Fourteenth Day of December, 1999

Attest:

Attesting Officer

Q. TODD DICKINSON

Acting Commissioner of Patents and Trademarks